July 12, 1966  K. V. MORRIS  3,260,252

VALVE SEATS

Filed Aug. 20, 1964

KARL V. MORRIS
INVENTOR.

BY:
Atty.

United States Patent Office 3,260,252
Patented July 12, 1966

3,260,252
VALVE SEATS
Karl V. Morris, 6708 W. County Road, Odessa, Tex.
Filed Aug. 20, 1964, Ser. No. 390,874
5 Claims. (Cl. 123—188)

This invention relates to valve seats and more particularly to a two part seat with a readily replaceable insert.

More particularly this invention is concerned with valve seats for large, spark ignition, fuel injection engines. Typical examples of such engines are the "Clark" engines.

With heavy duty engines which run continuously the faces of the valve seat of the fuel injection valves tend to become worn. As they wear they may be reground. However, there is a definite life and amount of regrinding which may be performed. After they have been reground a number of times it is necessary to replace the valve seat. Obviously if there were an insert or a small inner ring which could be replaced it would be more economical to replace this smaller part. This is particularly true inasmuch as in this particular service expensive alloy steels are used.

Therefore, I have invented a two part valve seat with a readily replaceable insert for the face of the valve seat, the part of the valve seat which is primarily eroded, corroded and otherwise deteriorated.

Also I have designed a valve seat wherein the insert is held in place by a plurality of set screws which generally extend radially through the outer portion of the valve seat against a groove in the insert or inner ring.

An object of this invention is to provide an insert for a two part valve seat wherein the insert may be readily removed and replaced by ordinary mechanics without special presses or other equipment.

Still further objects are to achieve the above with a device that is sturdy, compact, durable, simple, and reliable, yet inexpensive and easy to manufacture.

The specific nature of the invention as well as other objects, uses and advantages thereof will clearly appear from the following description and from the accompanying drawing, the different views of which are not necessarily to the same scale, in which.

Figure 1:
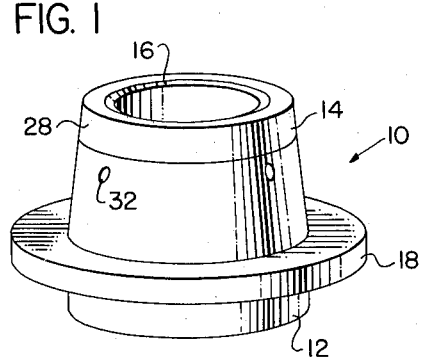
FIG. 1 is a perspective of the assembled valve seat.
Figure 2:
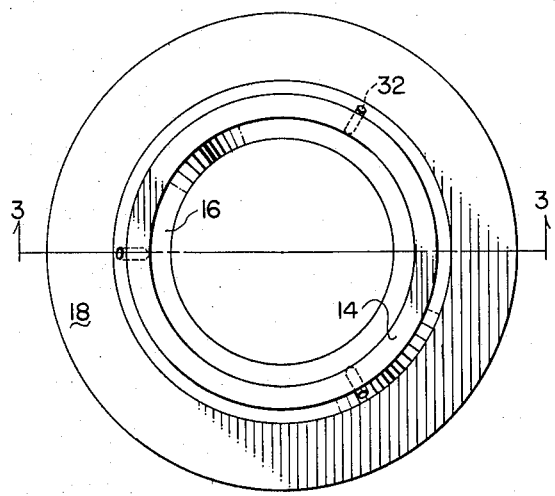
FIG. 2 is an inside view or top view of the assembled valve seat.
Figure 4:
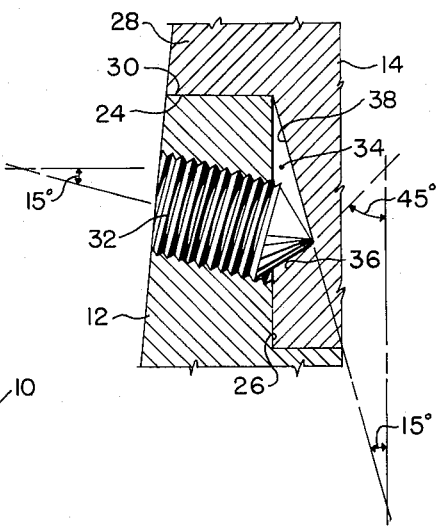
FIG. 4 is an enlarged partial sectional view showing details of construction similar to FIG. 3.
Figure 3:
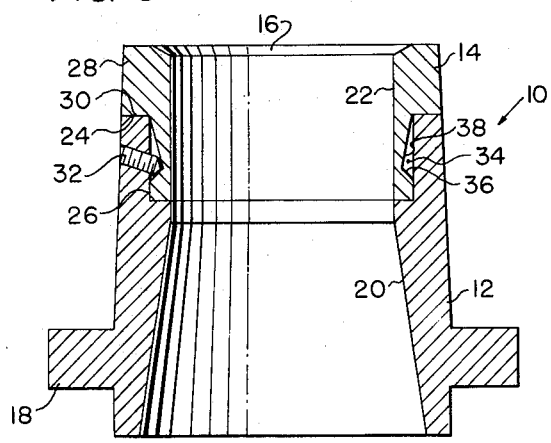
FIG. 3 is an axial sectional view of the assembled valve seat when on line 3—3 of FIG. 2.

Referring more specifically to the drawing, it may be seen that the assembled valve seat 10 is generally cylindrical in outline. The valve seat includes the outer cylindrical body 12 and the inner ring or insert 14 which has valve face 16, which the valve (not shown) seats upon. As shown this valve face 16 is beveled to match the shape of the valve. The outer body 12 has an external peripheral annular flange 18 surrounding it and which forms the means for attaching the valve seat 10 to the engine. The outer body 12 has bore 20 therethrough which is approximately the same diameter as bore 22 of the insert 14. The inside bore of the outer body 12 and the inner ring 14 are about the same diameter so that the assembled valve seat 10 has a smooth bore extending from one end to the other. The assembled outer body and insert have the same outline configuration as the integral valve seats known to the prior art and commercially on the market which form standard equipment for the engines now in service.

The outer body 12 has a radial shoulder 24 on one end thereof adjacent to internal annular notch 26 formed in the outer body. The insert 14 has a generally cylindrical external surface so that the inner insert 14 telescopes within the annular notch 26. The portion of the insert 14 adjacent to face 16 has external, annular, peripheral lips 28 which extends to the full diameter of the outer body 12. The lip 28 has a radial shoulder 30 which mates with the radial shoulder 24 forming a seal between the insert 14 and outer body 12. This seal between radial shoulders 24 and 30 is a metal to metal seal formed by the smooth surfaces of the two radial shoulders.

The insert 14 is held in place by three set screws 32 which extend generally radially through the outer body 12. However, more particularly they angle outwardly by an angle of 15° measured from the radial shoulder 24. The point of the set screws 32 bear against annular groove 34 in the external surface of the insert 14. This annular groove 34 is defined by outer wall 36 which is angled at 45° to the axis of the ring 14. The inner wall 38 or other wall defining the annular groove 34 angles at an angle of 15° to the axis of the insert 14. The set screws 32 have cone shaped points upon them and these conic points primarily bear against the outer wall 36.

The inner wall 38 and outer wall 36 have been called walls, it will be understood that they would be parts of a conic section inasmuch as they are formed on a cylindrical element. Also it will be understood that the face 16 is on the inside or opens to the inside of a cylinder of the internal combustion engine and that therefore this is considered the inside and the other end of the valve seat extending along the axis of the valve seat 10 is considered the outside inasmuch as it extends to the outside of the engine. The details of the mounting of the valve seat 10 within the engine are not shown or described inasmuch as this is well known and commercial embodiments are in use throughout the country.

It will be apparent that the embodiment shown is only exemplary and that various modifications can be made in construction, materials, and arrangement within the scope of the invention as defined in the appended claims.

I claim as my invention:

1. A two part valve seat adapted for use with a valve into a cylinder of an internal combustion engine comprising:
 (a) an outer cylindrical body,
 (b) means on the outer body for attaching the valve seat to the engine,
 (c) an inner ring partially telescoped in the outer body,
 (d) said outer body having an annular notch in the inside of one end in which the inner ring fits,
 (e) the inside bore of the outer body and inner ring being about the same so that the valve seat has a smooth bore extending from one end to the other,
 (f) a radial shoulder on the end of the outer body adjacent to the annular notch,
 (g) the inner ring having an external peripheral annular lip at one end thereof,
 (h) the lip on the inner ring having a radial shoulder which mates with radial shoulder on the outer body to form a seal between the parts, and
 (j) a plurality of screws extending through the outer body to bear at their point against
 (k) an annular groove in that part of the inner ring which is telescoped within the outer body.

2. The invention as defined in claim 1 wherein
 (m) said means on the outer body for attaching is in the form of an external peripheral annular flange surrounding the outer body.

3. The invention as defined in claim 1 wherein
 (m) said set screws are set at an angle to the plane of the radial shoulder of the outer body.

4. The invention as defined in claim 3 wherein
 (n) said angle is about 15°.

5. The invention as defined in claim 4 wherein
    (o) said annular groove is defined by an outer wall which is angled 45° to the axis of the ring and an inner wall which is angled 15° to the axis of the ring.

References Cited by the Examiner

UNITED STATES PATENTS

| | | | |
|---|---|---|---|
| 1,047,015 | 12/1912 | Elrod | 123—188 |
| 1,770,112 | 7/1930 | Smith | 123—188 X |
| 1,958,004 | 5/1934 | Jehle | 123—188 |
| 2,191,485 | 2/1940 | Jensen. | |
| 2,790,460 | 4/1957 | Radd | 137—533.15 |
| 2,949,901 | 8/1960 | Spencer et al. | 123—41.82 |
| 3,115,127 | 12/1963 | Spencer et al. | 123—41.85 X |

FOREIGN PATENTS 777,949   12/1934   France.

MARK NEWMAN, *Primary Examiner.*

A. L. SMITH, *Assistant Examiner.*